(12) United States Patent
Christensen et al.

(10) Patent No.: US 11,547,175 B2
(45) Date of Patent: Jan. 10, 2023

(54) SHAPE MEMORY SOLE

(71) Applicant: Reebok International Limited, London (GB)

(72) Inventors: Brian J. Christensen, Centerville, MA (US); Frank Millette, Middleboro, MA (US); Erasmo Rodriguez, Boston, MA (US)

(73) Assignee: Reebok International Limited, London (GB)

( * ) Notice: Subject to any disclaimer, the term of this patent is extended or adjusted under 35 U.S.C. 154(b) by 137 days.

(21) Appl. No.: 16/723,031

(22) Filed: Dec. 20, 2019

(65) Prior Publication Data
US 2021/0186148 A1    Jun. 24, 2021

(51) Int. Cl.
| A43B 13/18 | (2006.01) |
| A43B 13/10 | (2006.01) |
| A43B 13/04 | (2006.01) |

(52) U.S. Cl.
CPC .............. *A43B 13/10* (2013.01); *A43B 13/04* (2013.01); *A43B 13/181* (2013.01); *A43B 13/183* (2013.01)

(58) Field of Classification Search
CPC ....... A43B 13/10; A43B 13/026; A43B 13/14; A43B 13/18; A43B 13/181; A43B 13/183
USPC ............................................ 36/25 R, 27, 28
See application file for complete search history.

(56) References Cited

U.S. PATENT DOCUMENTS

| 1,571,073 | A | * | 1/1926 | Tapling | A63B 25/10 36/114 |
|---|---|---|---|---|---|
| 2,953,861 | A | * | 9/1960 | Horten | A63B 25/10 36/7.8 |
| 5,070,629 | A | * | 12/1991 | Graham | A43B 13/181 36/27 |
| 5,237,758 | A | * | 8/1993 | Zachman | A43B 7/32 36/107 |
| 5,337,492 | A | * | 8/1994 | Anderie | A43B 13/181 36/114 |
| 5,367,790 | A | * | 11/1994 | Gamow | A43B 5/06 36/7.8 |
| 5,561,920 | A | * | 10/1996 | Graham | A43B 1/0072 36/27 |
| 5,729,917 | A | * | 3/1998 | Slepian | A43B 13/181 36/27 |
| 5,743,028 | A | * | 4/1998 | Lombardino | A43B 21/28 36/27 |
| 6,231,946 | B1 | * | 5/2001 | Brown, Jr | A43B 13/026 404/134 |
| 6,675,500 | B1 | * | 1/2004 | Cadamuro | A43B 1/0018 36/27 |
| 6,763,611 | B1 | * | 7/2004 | Fusco | A43B 13/125 36/25 R |
| 6,886,274 | B2 | * | 5/2005 | Krafsur | A43B 7/1425 36/27 |
| 7,314,125 | B2 | * | 1/2008 | Smaldone | F16F 7/00 188/372 |
| 8,151,485 | B2 | * | 4/2012 | Hurd | A43B 13/184 36/103 |
| 8,978,272 | B2 | * | 3/2015 | Hurd | A43B 13/125 36/27 |

(Continued)

*Primary Examiner* — Marie D Bays
(74) *Attorney, Agent, or Firm* — Sterne, Kessler, Goldstein & Fox P.L.L.C.

(57) ABSTRACT

An article of footwear includes an upper and a sole coupled to the upper. The sole includes one or more elongate shape memory components that define a cavity and form a midsole.

22 Claims, 21 Drawing Sheets

(56) References Cited

U.S. PATENT DOCUMENTS

| | | | |
|---|---|---|---|
| 9,017,806 B2* | 4/2015 | Jacobsen | B32B 5/24 428/304.4 |
| 2002/0038522 A1* | 4/2002 | Houser | A61F 5/14 36/28 |
| 2002/0133977 A1* | 9/2002 | Pan | A43B 21/26 36/35 R |
| 2003/0188455 A1* | 10/2003 | Weaver, III | A43B 5/00 36/27 |
| 2004/0068893 A1* | 4/2004 | Kendall | A43B 7/24 36/88 |
| 2005/0108897 A1* | 5/2005 | Aveni | A43B 13/187 36/27 |
| 2005/0120593 A1* | 6/2005 | Mason | A43D 999/00 36/107 |
| 2005/0268489 A1* | 12/2005 | Austin | A43B 13/183 36/27 |
| 2006/0065499 A1* | 3/2006 | Smaldone | A43B 13/183 188/372 |
| 2006/0254087 A1* | 11/2006 | Fechter | A43B 13/183 36/27 |
| 2008/0078101 A1* | 4/2008 | Smith | A43B 21/26 36/28 |
| 2008/0250670 A1* | 10/2008 | Lefebvre | A43B 13/18 36/102 |
| 2009/0107006 A1* | 4/2009 | Ahn | A63B 25/10 36/27 |
| 2011/0167672 A1* | 7/2011 | Bond | A43B 13/223 36/28 |
| 2015/0040428 A1* | 2/2015 | Davis | A43B 13/12 36/83 |
| 2015/0040435 A1* | 2/2015 | Barnes | A43B 13/141 36/102 |
| 2015/0089834 A1* | 4/2015 | Baum | A43B 13/183 36/27 |
| 2021/0037914 A1* | 2/2021 | Adametz | A43B 21/32 |

* cited by examiner

SHAPE MEMORY SOLE

BACKGROUND

Field

Embodiments of the present invention relate generally to soles for articles of footwear; and more specifically to a shape memory sole comprising a shape memory alloy, a shape memory plastic polymer, or a plastic polymer with superelastic properties.

Background

Articles of footwear protect and cushion the wearer's feet. In particular, the sole provides cushioning and support as the wearer walks, runs, or performs other activities to reduce the force and stress acting on the wearer. At the same time, soles should be lightweight, which can also reduce the force and stress acting on the wearer. To provide these features, soles are often made of foam. Over time, however, wear and tear may damage the sole and the sole's cushioning properties may decline, leading to reduced effectiveness and increased stress on the wearer's feet.

BRIEF SUMMARY

Articles of footwear with a shape memory sole are disclosed. The shape memory sole may comprise a shape memory alloy, a shape memory plastic polymer, or a plastic polymer with superelastic properties. In some embodiments, an article of footwear includes an upper and a sole coupled to the upper. In some embodiments, the sole includes one or more elongate shape memory components that define a cavity and form a midsole.

In some embodiments, the one or more elongate shape memory components include a nickel titanium alloy. In some embodiments, the midsole also includes a frame that receives the one or more elongate shape memory components. In some embodiments, the article of footwear also includes a covering that encloses the one or more elongate shape memory components. In some embodiments, the article of footwear also includes a component disposed in the cavity between the upper and the one or more elongate shape memory components.

In some embodiments, the one or more elongate shape memory components extend back and forth in a transverse direction from a heel of the sole to a toe of the sole. In some embodiments, the one or more elongate shape memory components includes only one elongate shape memory component.

In some embodiments, an article of footwear includes one or more shape memory components that are shaped to form a bottom of a midsole. In some embodiments, the article of footwear includes a base that is disposed above and receives the one or more shape memory components.

In some embodiments, the base includes a frame forming part of the midsole. In some embodiments, the base includes foam. In some embodiments, the base is an upper. In some embodiments, the one or more shape memory components includes a nickel titanium alloy. In some embodiments, the one or more shape memory components are wire. In some embodiments, the one or more shape memory components are ribbon-shaped components.

In some embodiments, a method of making an article of footwear includes arranging one or more shape memory components on a base to form a midsole and attaching an upper to the midsole.

In some embodiments, the method also includes forming the one or more shape memory components by an additive process. In some embodiments, arranging the one or more shape memory components forms a cavity between the upper and the one or more shape memory components.

In some embodiments, the base includes a frame with holes. In some embodiments, arranging the one or more shape memory components on the base includes inserting the one or more shape memory components through the holes. In some embodiments, arranging the one or more shape memory components on the base includes arranging the one or more shape memory components in a transverse direction.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
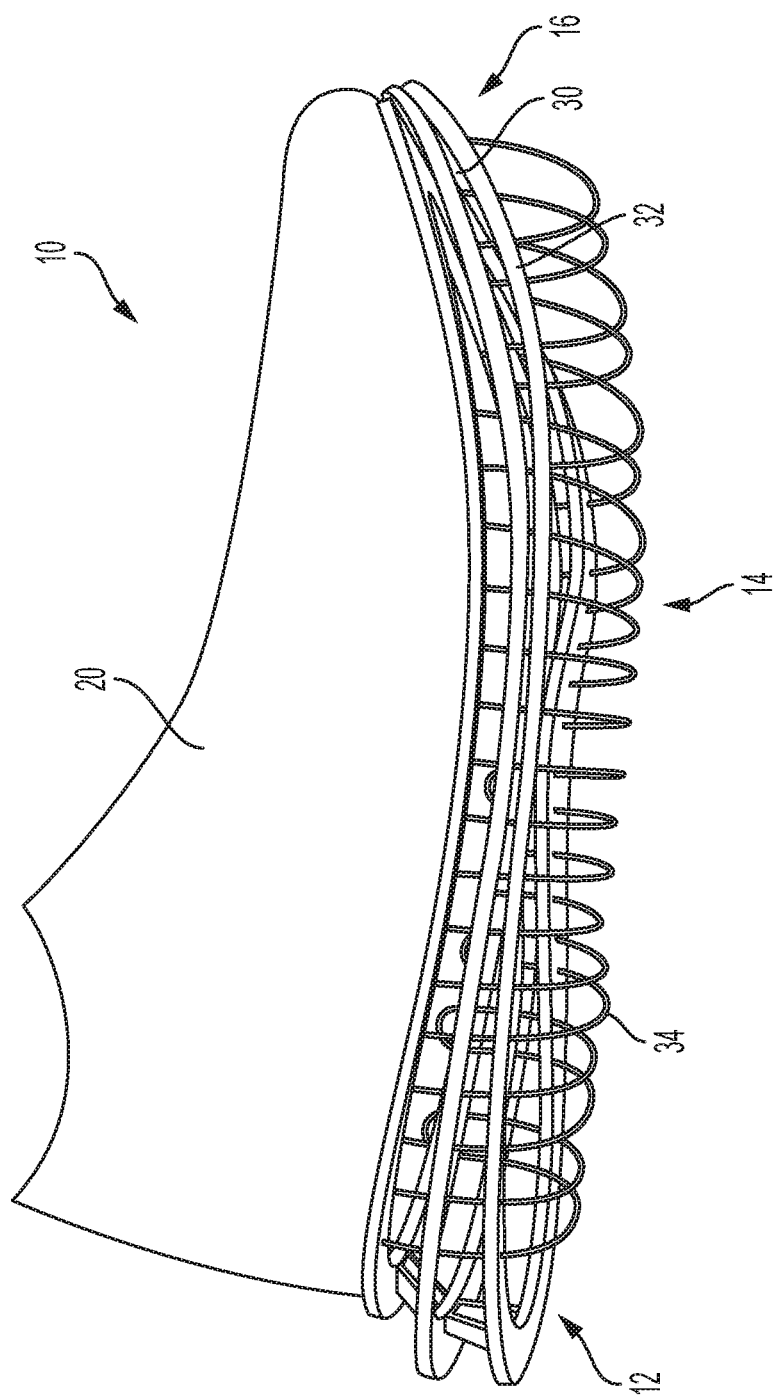
FIG. 1 shows a side view of an article of footwear with a shape memory sole according to some embodiments.

The present invention will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Embodiments of the present invention provide articles of footwear with a shape memory sole. In some embodiments, the shape memory sole is both lightweight and also protects and cushions the wearer's feet. For example, the shape memory sole may provide cushioning and support as the wearer walks, runs, or performs other activities to reduce the force and stress acting on the wearer. In some embodiments, the shape memory sole retains its cushioning and support properties over time and withstands wear and tear better than, for example, foam soles. The shape memory sole may include a shape memory alloy, a plastic polymer with superelastic properties, or both.

In some embodiments, a shape memory sole includes one or more shape memory components. A shape memory alloy is an alloy that, when deformed, will return to its pre-deformed shape when subject to heat or cooling. The temperature at which the shape memory alloy returns to its pre-deformed shape may vary greatly based on alloy composition and other factors. In some embodiments, the temperature may be between 0° C. and 100° C. Other temperatures may also be used (e.g., below 0° C. or above 100° C.). In some embodiments, the shape memory alloy may retain its shape at room temperature. In some embodiments, the shape memory alloy has a superelastic or pseudoelastic property. Thus, the shape memory alloy may naturally realign itself to its original shape prior to entering the deformation material phase. In some embodiments, a shape memory sole includes one or more plastic polymer components with superelastic properties. In some embodiments, a shape memory sole includes both shape memory alloy components and components made of plastic polymer with superelastic properties.

Thus, as used herein, a shape memory component is a component having a material with superelastic or pseudoelastic properties (e.g., a shape memory alloy, a shape memory plastic polymer, a plastic polymer with superelastic or pseudo elastic properties, or combinations thereof). In some embodiments, the material of a shape memory component is configured to elastically recover from a deformation of more than 5% strain. For example, the material of a shape memory component may be configured to elastically recover from a deformation of approximately 10% strain. In some embodiments, the material of a shape memory component is configured to elastically recover from a deformation of more than 10% strain. In some embodiments, the material of a shape memory component is configured to elastically recover from a deformation of more than 100% strain.

In some embodiments, the one or more shape memory components form a midsole. In some embodiments, the one or more shape memory components form a portion of a midsole. The one or more shape memory components may be elongate (e.g., wire, thread, rods, ribbon-shaped, etc.). In some embodiments, the one or more shape memory components are shaped to define a cavity. In some embodiments, the one or more shape memory components are made of a nickel titanium alloy. Other shape memory alloys may also be used as the material for the one or more shape memory components. For example, the alloy may be a copper-zinc-aluminum-nickel, silver-cadmium, gold-cadmium, copper-aluminum-nickel, copper-aluminum-nickel-hafnium, copper-tin, copper-zinc, copper-zinc-silicon-aluminum-tin, iron-platinum, manganese-copper, iron-manganese-silicon, cobalt-nickel-aluminum, cobalt-nickel-gallium, nickel-iron-gallium, titanium-niobium, nickel-titanium, nickel-titanium-hafnium, nickel-titanium-palladium, or nickel-manganese-gallium alloy. Other alloys may also be used. In some embodiments, any material that is superelastic may be used for the shape memory components. For example, as mentioned above, a plastic polymer with superelastic properties may be used.

An article of footwear 10 with a shape memory sole 30 is shown, for example, in FIG. 1. In some embodiments, article of footwear 10 includes an upper 20 and a sole 30 coupled to the upper 20. Upper 20 may be made of a textile fabric, leather, synthetic, or film product. Other materials may also be used to make upper 20. In some embodiments, any type of upper may be used for upper 20. In some embodiments, sole 30 is coupled to upper 20 by bonding (e.g., with an adhesive), stitching, and/or other suitable methods of attachment.

Figure 2:
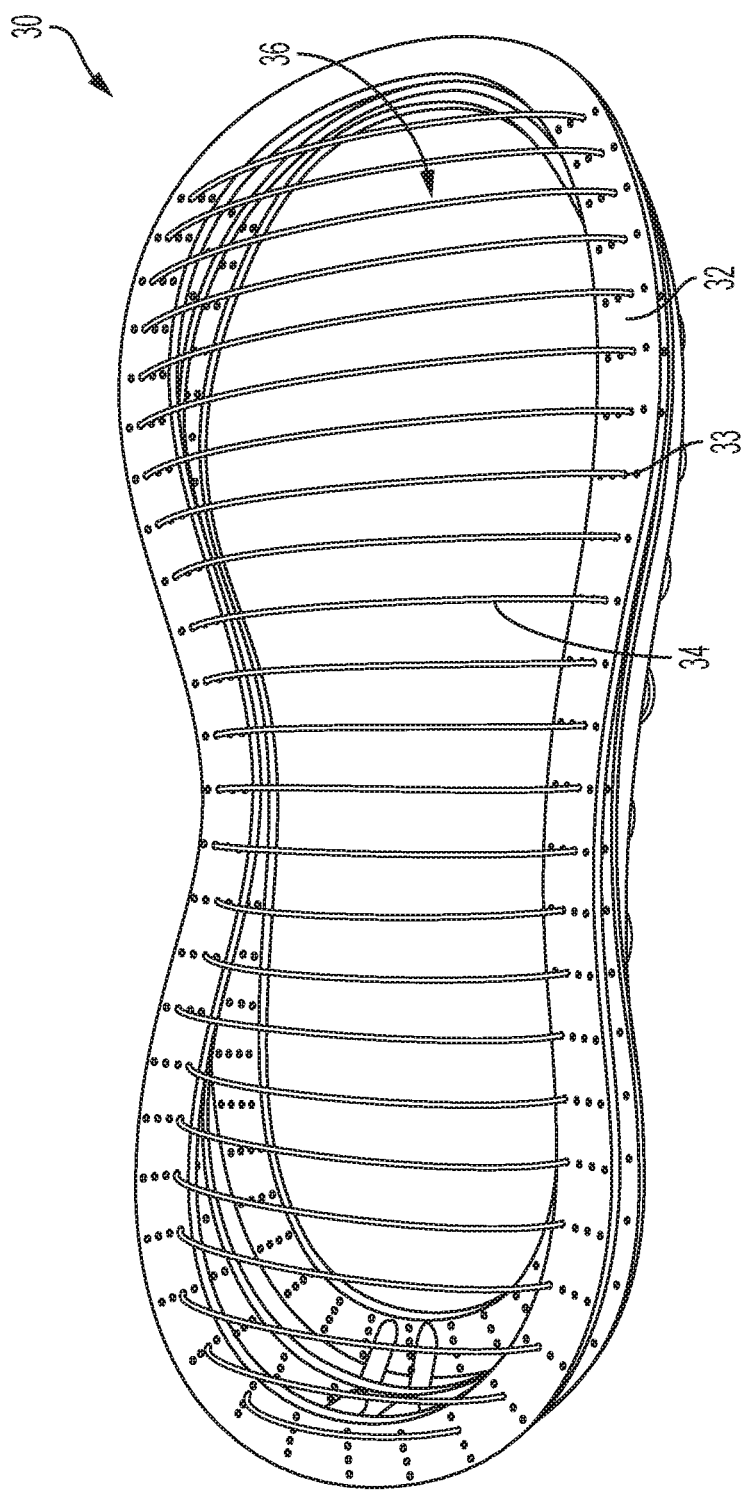
FIG. 2 shows a bottom view of a shape memory sole according to some embodiments.
Figure 3:
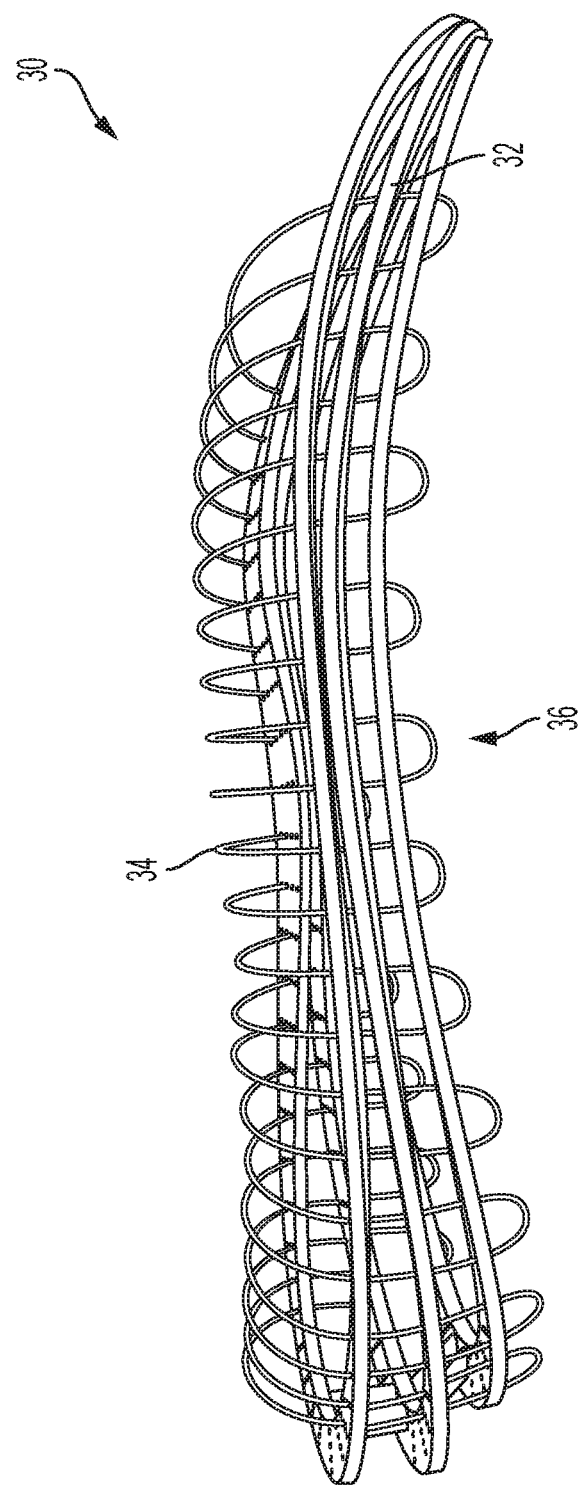
FIG. 3 shows a side view of a shape memory sole according to some embodiments.

In some embodiments, sole 30 includes a heel 12 and a toe 16 and a midfoot region 14 disposed between heel 12 and toe 16. In some embodiments, sole 30 includes a frame 32 and one or more shape memory components 34. In some embodiments, shape memory components 34 are elongate. For example, shape memory components 34 may be wire, as shown in FIGS. 1-3. In some embodiments, shape memory components 34 are thin wire. In some embodiments, shape memory components 34 are thread. In some embodiments, shape memory components 34 are rods. In some embodiments, shape memory components 34 are ribbon-shaped.

Different thicknesses may be used for shape memory components 34. For example, FIGS. 5-7 include one or more shape memory components 134 that are thicker than shape memory components 34 in FIGS. 1-3. In some embodiments, shape memory components 34 (and/or shape memory components 134) can have a thickness in the range of 0.001"-0.5". For example, shape memory components 34 may have a thickness of 0.001", 0.005", 0.01", 0.05", 0.1", 0.2", 0.3", 0.4", or 0.5". Other thicknesses (within or outside of the range) may also be used. In some embodiments, shape memory components 34, alone or together with frame 32 and/or other components, form a midsole of sole 30.

In some embodiments, shape memory components 34 are shaped to define a cavity 36, as shown, for example, in FIGS. 2 and 3. In some embodiments, cavity 36 is disposed between shape memory components 34 and upper 20. In some embodiments, frame 32 may surround cavity 36. For example, frame 32 may form a perimeter around cavity 36.

In some embodiments, frame 32 includes multiple layers (e.g., two, three, or more layers). For example, frame 32 in FIGS. 1-3 includes three layers. In some embodiments, frame 32 is made of a plastic material. In some embodiments, frame 32 is made of polyurethane. In some embodiments, frame 32 is made of polyamide. In some embodiments, frame 32 is made of foam. In some embodiments, frame 32 is made of ethylene vinyl acetate. Other foams may also be used. In some embodiments, frame 32 is also made of a shape memory alloy.

In some embodiments, frame 32 is configured to receive one or more shape memory components 34. For example, as shown in FIG. 2, frame 32 may include a plurality of holes 33 sized to receive shape memory components 34. In some embodiments, each layer of frame 32 may include a plurality of holes 33. In some embodiments, not every hole 33 is filled by a shape memory component 34. In other words, frame 32 may include more holes 33 than are needed to receive shape memory components 34. This may allow for customization in making sole 30. For example, shape memory components 34 may be passed through hole 33 on an inner part of frame 32, an intermediate part of frame 32, or an outer part of frame 32 to adjust the length of shape memory component 34 that extends from one side of frame 32 (e.g., on a lateral side of sole 30) to the other (e.g., on a medial side of sole 30). This change in length may affect, for example, the cushioning characteristics of sole 30.

In some embodiments, one or more elongate shape memory components 34 extend back and forth in a transverse direction across sole 30. In some embodiments, shape memory components 34 follow this pattern (i.e., back and forth in a transverse direction across sole 30) from heel 12 of sole 30 to toe 16 of sole 30. In some embodiments, shape memory components 34 do not extend all the way from heel 12 to toe 16 of sole 30. For example, shape memory components 34 may only be disposed from heel 12 to midfoot region 14 of sole 30. In some embodiments, shape memory components 34 may only be disposed from midfoot region 14 to toe 16 of sole 30. In some embodiments, shape memory components 34 may only be disposed at midfoot region 14, and not at heel 12 or toe 16, of sole 30.

In some embodiments, a single shape memory component 34 is used for sole 30. For example, a single shape memory component 34 may extend back and forth in a transverse direction across sole 30 from heel 12 to toe 16. In some embodiments, the single shape memory component 34 extends upwardly through one or more holes 33 (e.g., in different layers of frame 32) then loops back to extend downwardly through one or more adjacent holes 33, and then extends across sole 30 in the transverse direction. This may repeat itself from one end of sole 30 (e.g., heel 12) to the other end of sole 30 (e.g., toe 16).

In some embodiments, multiple shape memory components 34 extend in a transverse direction across sole 30. For example, each length of shape memory material across sole 30 may be its own separate component 34. As another example, each component 34 may extend back and forth once across sole 30. In some embodiments, each component 34 extends across sole 30 three or more times. In some embodiments, the ends of each shape memory component 34 is configured to prevent shape memory component 34 from coming apart from frame 32. For example, the ends of each shape memory component 34 may be attached to frame 32 (e.g., via an adhesive, welding, etc.), may be sized to not fit through holes 33, or may be tied or otherwise secured to frame 32. In some embodiments, shape memory components 34 may be attached to frame 32 without the use of holes 33. For example, in some embodiments, frame 32 does not include any holes 33.

In some embodiments, the density of shape memory components 34 across sole 30 may alter the response of sole 30 (e.g., the cushioning characteristics). For example, a sole 30 having a greater density of shape memory components (in which shape memory components 34 are closer together) may return to shape quicker, or return more closely to shape, than a sole having a lower density (in which shape memory components 34 are more spread apart). Thus, the properties of sole 30 may come from the arrangement of shape memory components 34, in addition to the material of shape memory components 34.

Other configurations of shape memory components 34 are also possible. In some embodiments, shape memory components 34 extend back and forth across sole 30 in a longitudinal direction. In some embodiments, shape memory components 34 may cross over each other. For example, shape memory components 34 may be arranged to form a repeating X-pattern. Shape memory components 34 may be woven like a fabric. In some embodiments, any woven geometry may be used, particularly for wire or thread applications (e.g., when shape memory components 34 are wire or thread). In some embodiments, shape memory components 34 may be molded (e.g., made by injection molding, casting, blow molding, etc.). For example, shape memory components 34 may be arranged as a molded cage or molded mesh (see, e.g., FIGS. 8, 9, and 12-21). In some embodiments, a beam geometry may be used for shape memory components 34.

In some embodiments, shape memory components 34 are shaped to form a bottom of a midsole. In some embodiments, shape memory components 34 are curved (see, e.g., FIGS. 1 and 3). In some embodiments, shape memory components 34 bow downward away from upper 20 and/or away from frame 32. Where shape memory components 34 bow downward away from frame 32, cavity 36 may extend below frame 32. In some embodiments, shape memory components 34 deform as the wearer steps or puts pressure on the wearer's foot in article of footwear 10, thus providing cushioning to the wearer's foot. As the wearer lifts the foot in article of footwear 10, shape memory components 34 return to their original shape due to the mechanical properties of the shape memory material (e.g., shape memory alloy or plastic polymer with superelastic properties) used to make components 34.

In some embodiments, shape memory components 34 are made of a nickel titanium alloy. In some embodiments, shape memory components 34 are made with an additive process. For example, shape memory components 34 could be made by additive manufacturing (e.g., 3D printing) of super-elastic shape memory polymers or shape memory metals (e.g., nickel titanium or other shape memory alloys). In some embodiments, shape memory components 34 are reinforced with a fabric.

Figure 4:
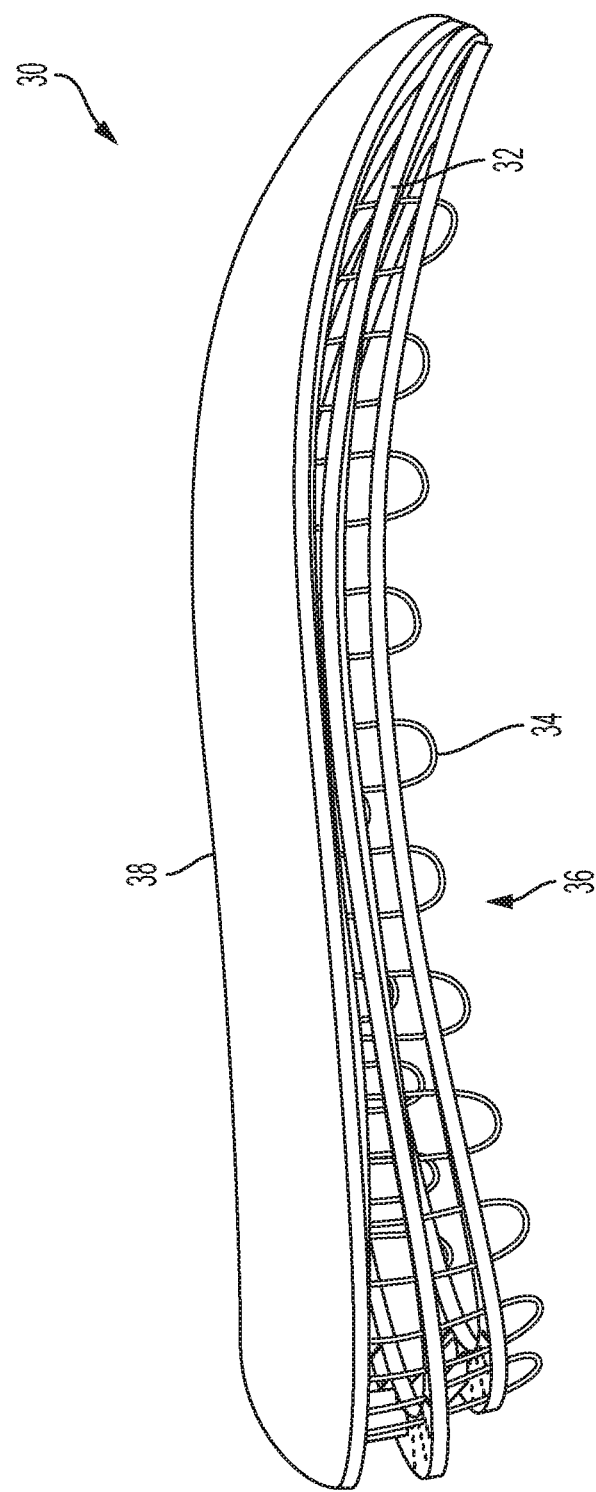
FIG. 4 shows a side view of a shape memory sole according to some embodiments.

In some embodiments, sole 30 includes a covering 38, as shown, for example, in FIG. 4, that encloses shape memory components 34. In some embodiments, covering 38 is a tarp-like covering. In some embodiments, covering 38 comprises an outsole. In some embodiments, shape memory components 34 are not visible from an exterior of article of footwear 10. In some embodiments, the covering 38 may be one or more blow-molded component that encloses one or more shape memory components 34.

Figure 5:
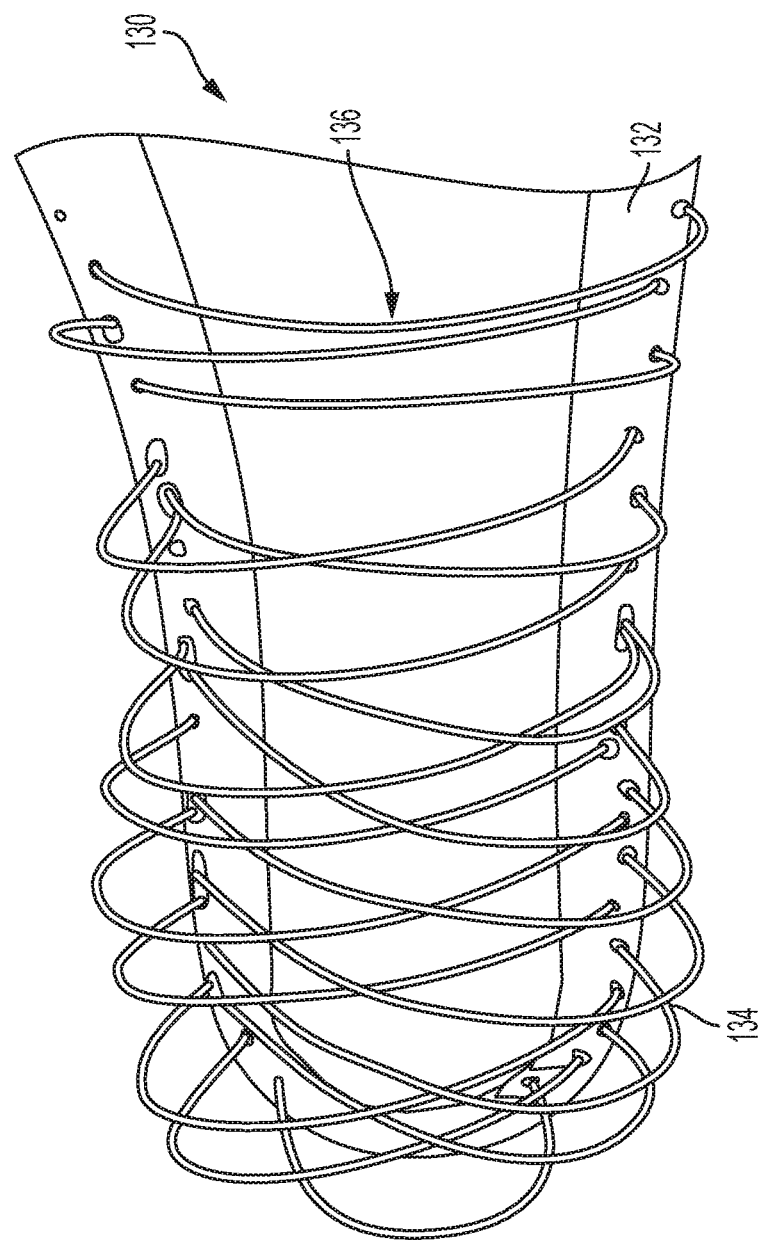
FIG. 5 shows a bottom view of a portion of a shape memory sole according to some embodiments.
Figure 6:
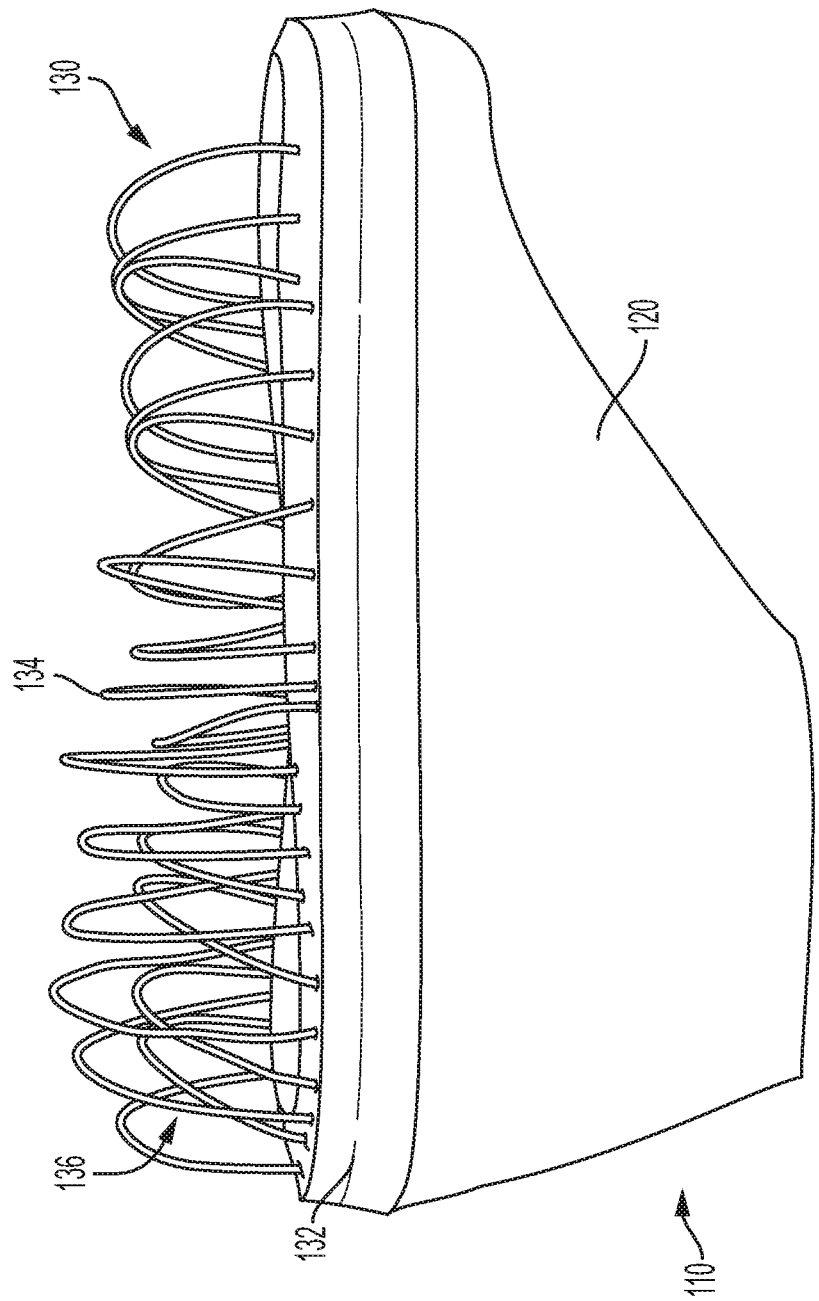
FIG. 6 shows a side view of an article of footwear with a shape memory sole according to some embodiments.
Figure 7:
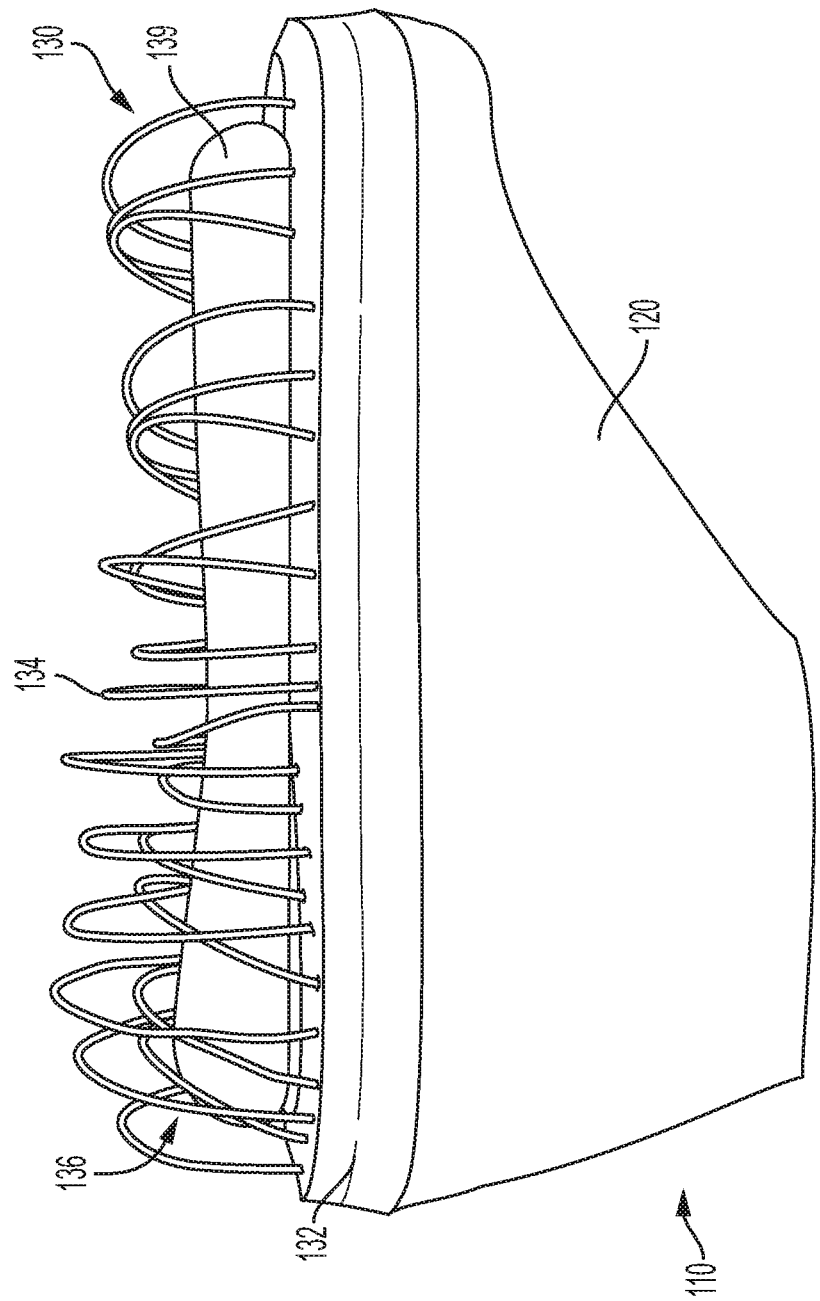
FIG. 7 shows a side view of an article of footwear with a shape memory sole according to some embodiments.

In some embodiments, as shown, for example, in FIGS. 5-7, an article of footwear 110 may include upper 120 and sole 130. In some embodiments, sole 130 is coupled to upper 120. Sole 130 and upper 120 may have any of the characteristics described above with respect to sole 30 and upper 20, respectively. In some embodiments, sole 130 comprises one or more shape memory components 134. Shape memory components 134 may have any of the characteristics described above with respect to shape memory components 34. In some embodiments, shape memory components 134 are made of a nickel titanium alloy.

In some embodiments, article of footwear 110 includes a base 132. In some embodiments, base 132 is disposed above (i.e., farther from the ground when article of footwear 110 is worn) shape memory components 134. In some embodiments, base 132 is configured to receive one or more shape memory components 134. In some embodiments, base 132 is a frame (e.g., similar to frame 32). Thus, base 132 may comprise holes similar to holes 33. In some embodiments, base 132 is a frame forming part of a midsole of sole 130.

In some embodiments, base 132 comprises foam. For example, base 132 may be similar to a foam midsole and shape memory components 134 may be embedded within base 132 (see FIGS. 5-7) to provide cushioning properties that withstand wear and tear better than a foam midsole. In some embodiments, base 132 is part of upper 120. In other words, the midsole of sole 30 may be formed only using shape memory components 134.

In some embodiments, shape memory components 134 form a cavity 136. In some embodiments, cavity 136 is disposed between shape memory components 134 and base 132. In some embodiments, cavity 136 is disposed between shape memory components 134 and upper 120. In some embodiments, as shown, for example, in FIG. 7, article of footwear 110 includes a component 139 disposed in cavity 136 (e.g., between upper 120 and one or more shape memory components 134. In some embodiments, component 139 comprises foam. In some embodiments, component 139 provides a limit to deformation of shape memory components 134.

In some embodiments, shape memory components 134 form a plurality of arcs. In some embodiments, each arc has the same dimensions (similar to shape memory components 34 in FIGS. 1-3). In some embodiments, arcs may have different dimensions. For example, as shown in FIGS. 5-7, some arcs are bigger and extend farther from base 132 than other arcs. Providing different sized arcs with shape memory components 134 may allow for increased customization of cushioning and support.

Although FIGS. 5-7 shows shape memory components 134 extending back and forth in a transverse direction across sole 130, other configurations may also be used (e.g., extending in a longitudinal direction or crossing over each other to form a repeating X-pattern). In some embodiments, a single shape memory component 134 is used. In some embodiments, multiple shape memory components 134 are used.

In some embodiments, article of footwear 110 is made by arranging one or more shape memory components 134 on base 132 to form a sole 130 (e.g., a midsole) and attaching upper 120 to sole 130. In some embodiments, base 132 includes a frame with holes (e.g., similar to frame 32 with holes 33).

In some embodiments, shape memory components 134 are formed by an additive process. For example, shape memory components 134 could be made by additive manufacturing (e.g., 3D printing) of super-elastic shape memory polymers or shape memory metals (e.g., nickel titanium or other shape memory alloys). In some embodiments, shape memory components 134 are arranged to form a cavity 136 between upper 120 and one or more shape memory components 134.

In some embodiments, arranging one or more shape memory components 134 on base 132 includes inserting one or more shape memory components 134 through holes in a frame (e.g., similar to holes 33 of frame 32). In some embodiments, arranging one or more shape memory components 134 on base 132 includes arranging one or more shape memory components 134 in a transverse direction.

Figure 8:
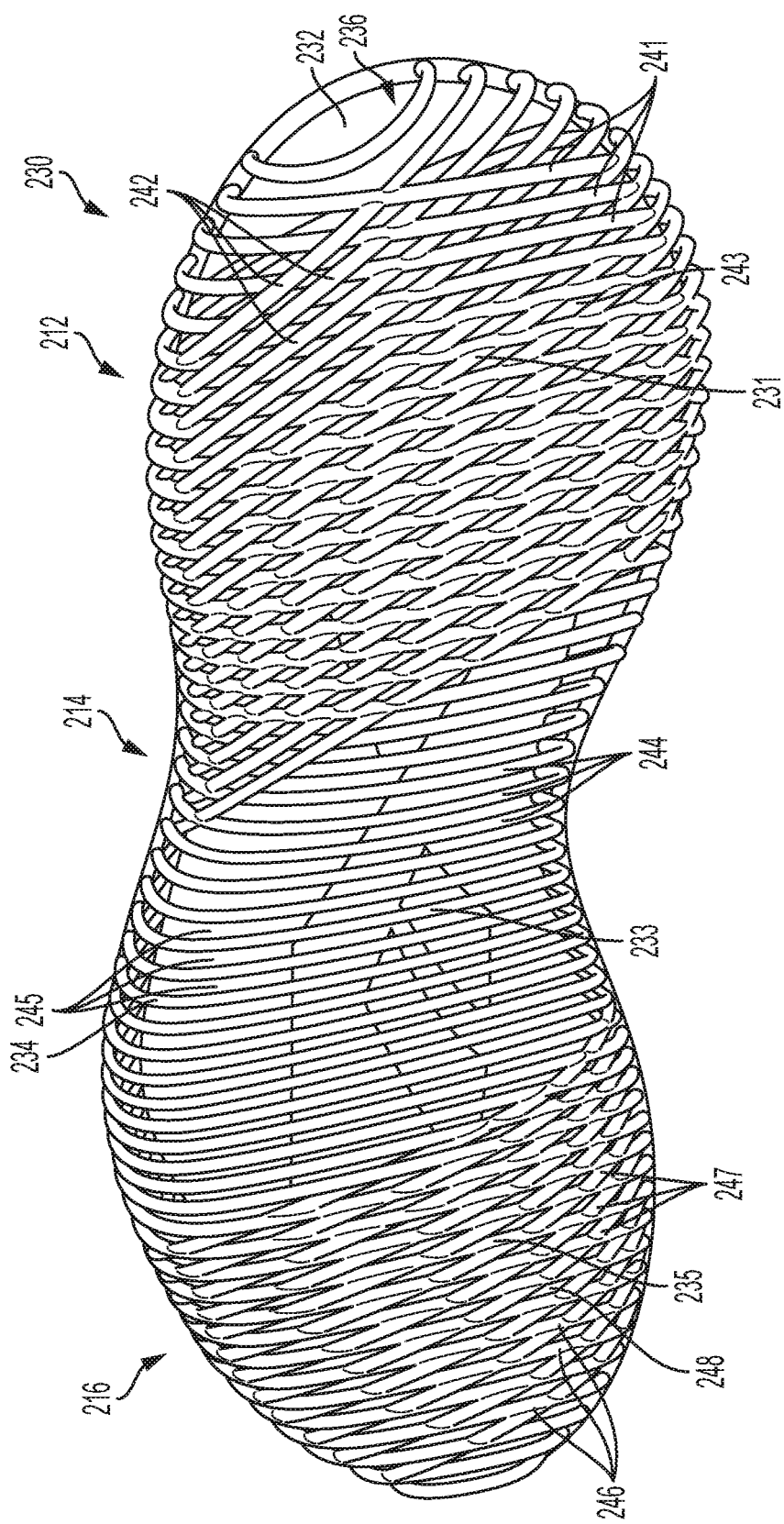
FIG. 8 shows a bottom view of a shape memory sole according to some embodiments.
Figure 9:
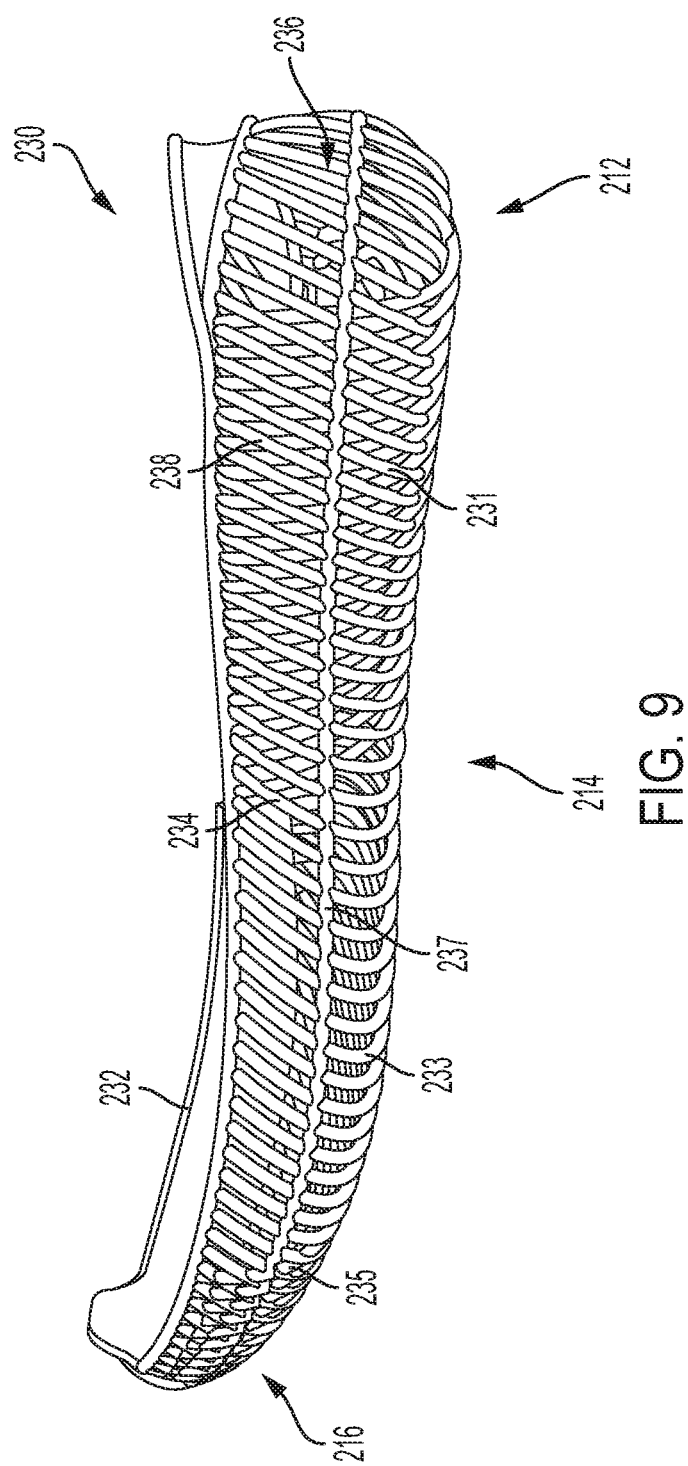
FIG. 9 shows a side view of a shape memory sole according to some embodiments.

In some embodiments, a shape memory sole comprises one or more molded components. For example, as shown in FIGS. 8 and 9, sole 230 (which may include a heel 212, a midfoot region 214, and a toe 216) may be molded from a shape memory material, such as a shape memory alloy or a plastic polymer with superelastic properties. Sole 230 may comprise a base 232 and one or more elongate shape memory components 234. In some embodiments, a shape memory molded component (e.g., base 232 and one or more elongate shape memory components 234) makes up the entire sole 230. In some embodiments, sole 230 includes additional components (e.g., a foam midsole) other than the shape memory molded component.

In some embodiments, base 232 may form a plate that extends across the entire length and/or width of sole 230. For example, base 232 may extend from heel 212 to toe 216 and from a medial edge of sole 230 to a lateral edge of 230. Thus, base 232 may support a wearer's foot (although there may be one or more components between base 232 and the wearer's foot (e.g., an insole, a sock liner)). In some embodiments, base 232 may be similar in shape to base 32 described above.

In some embodiments, one or more elongate shape memory components 234 are positioned below base 232. In some embodiments, a cavity 236 is formed between elongate shape memory components 234 and base 232. For example, elongate shape memory components 234 may extend down from a medial edge of base 232, thus forming a sidewall 238 of sole 230, as shown in FIG. 9. The elongate shape memory components 234 may then extend across the width of base 232, as shown in FIG. 8, and back up to base 232 at a lateral edge of base 232, forming another sidewall 238 of sole 230. This configuration forms a cavity 236 with elongate shape memory components 234 providing a height to sole 230. The height of sole 230 provided by elongate shape memory components 234 may vary from heel 212 to toe 216. In some embodiments, a horizontal elongate shape memory component 237 may extend around the perimeter of sole 230 to form part of sidewall 238, as shown in FIG. 9.

The configuration of elongate shape memory components 234 may vary in different regions of sole 230. For example, as shown in FIGS. 8 and 9, sole 230 comprises three configurations 231, 233, 235 with different arrangements of elongate shape memory components 234. Configuration 231 may be disposed in heel 212 of sole 230. In some embodiments, configuration 231 is partially disposed in midfoot region 214. In configuration 231, a first set 241 of elongate shape memory components 234 extends across the width of base 232 in a lateral direction (or in a substantially lateral direction) and a second set 242 of elongate shape memory components 234 extends across the width of base 232 at an angled direction in between a longitudinal direction and a lateral direction. This arrangement forms an X-like pattern of elongate shape memory components 234 with diamond-shaped gaps 243 between elongate shape memory components 234.

Configuration 233 may be disposed in midfoot region 214. In some embodiments, configuration 233 only includes a set 244 of elongate shape memory components 234 that extend across the width of base 232 in a lateral direction (or in a substantially lateral direction). Thus, elongate shape memory components 234 in configuration 233 are substantially parallel to each other so that they do not intersect with each other. In some embodiments, configuration 233 provides parallel gaps 245 disposed between elongate shape memory components 234 of set 244.

Configuration 235 may be disposed in toe 216. In some embodiments, configuration 235 includes two sets of elongate shape memory components 234, similar to configuration 231. For example, configuration 235 may include a first set 246 of elongate shape memory components 234 extending across the width of base 232 in a lateral direction (or in a substantially lateral direction) and a second set 247 of elongate shape memory components 234 that extends across the width of base 232 at an angled direction in between a longitudinal direction and a lateral direction. However, the angled direction may be at a different angle than the angled direction of configuration 231. For example, the angled direction in configuration 235 may be closer to the lateral direction. In some embodiments, configuration 235 forms an X-like pattern of elongate shape memory components 234 with diamond-shaped gaps 248 between elongate shape memory components 234.

Other configurations of elongate shape memory components 234 may also be used. Various configurations may include any combination of elongate shape memory components in a lateral direction, a longitudinal direction, and an angled direction between a longitudinal direction and a lateral direction. For example, a configuration of elongate shape memory components 234 may include a set of elongate shape memory components 234 in a first angled direction and a set of elongate shape memory components 234 in a second angled direction.

Figure 10:
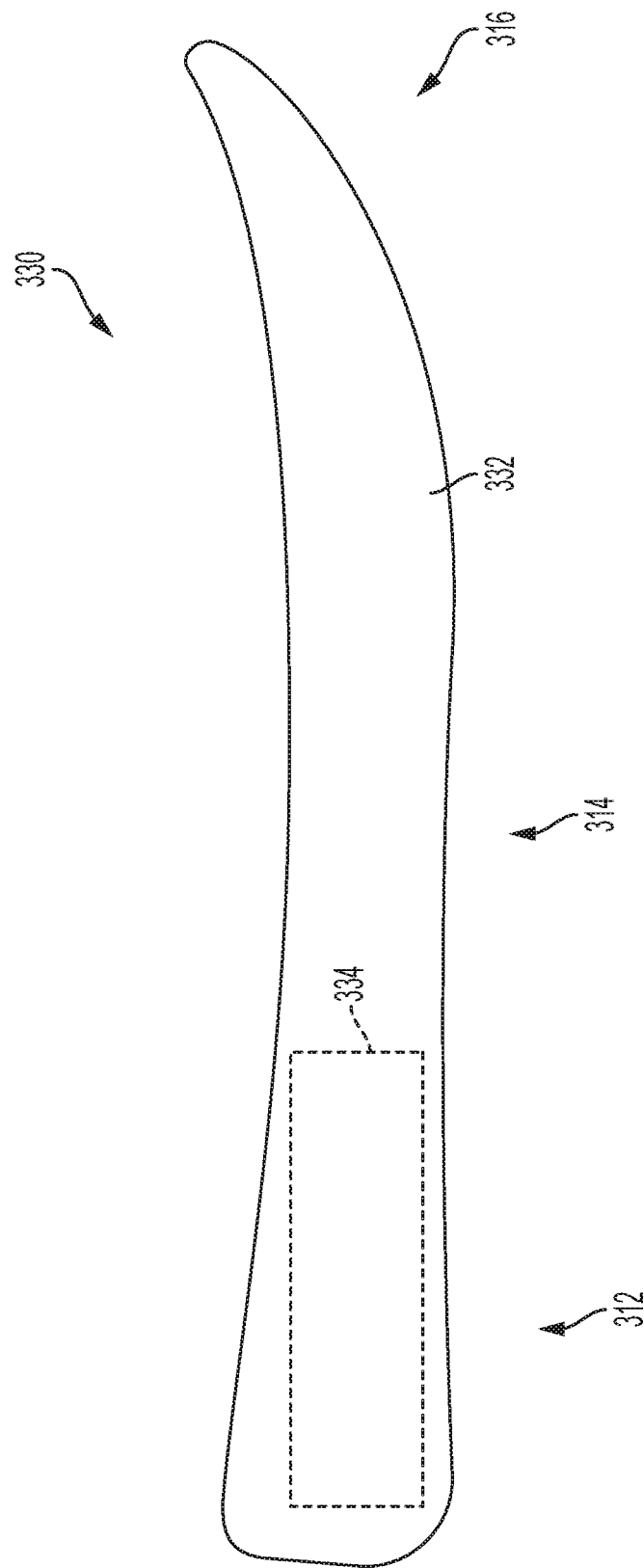
FIG. 10 shows a side view of a shape memory sole according to some embodiments.
Figure 11:
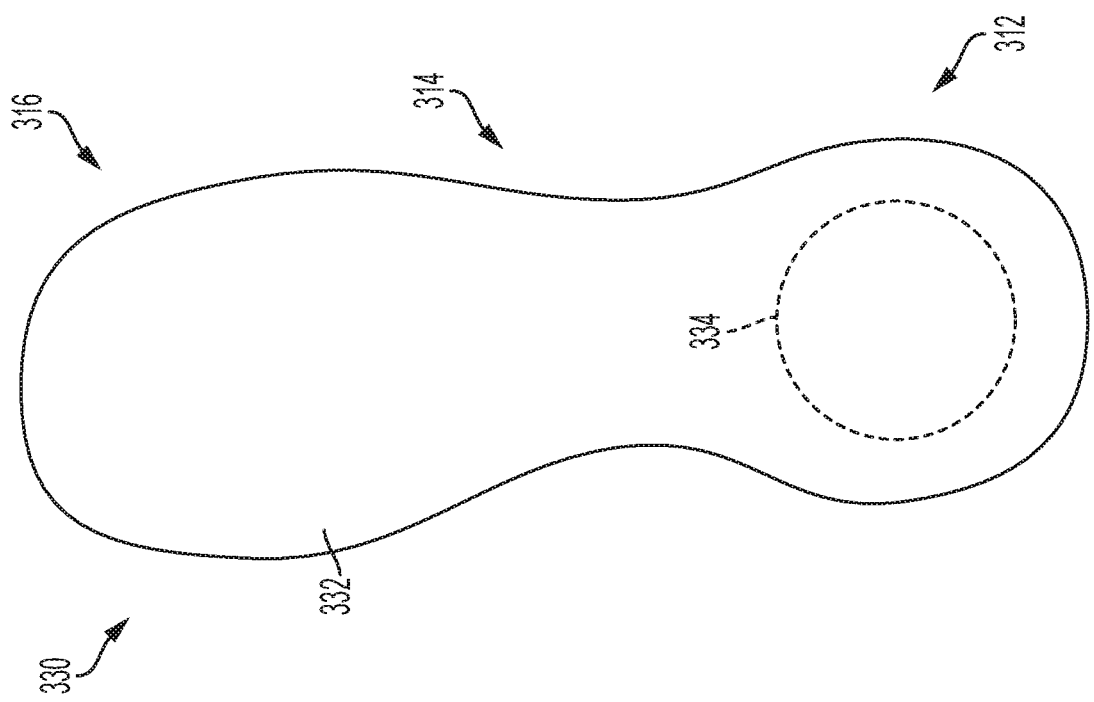
FIG. 11 shows a bottom view of a shape memory sole according to some embodiments.

In some embodiments, a shape memory sole is only partially made of shape memory material. As shown in FIGS. 10 and 11, for example, a shape memory sole 330 includes a shape memory component 334 embedded within sole body 332. Sole body 332 may be a foam or other material that is not a shape memory material. Sole 330 may include a heel 312, a midfoot region 314, and a toe 316. Shape memory component 334 may be disposed in heel 312, as shown in FIGS. 10 and 11. In some embodiments, shape memory component 334 may be disposed in midfoot region 314 or toe 316. In some embodiments, shape memory components 334 may extend across one or more of heel 312, midfoot region 314, and toe 316. Sole 330 may include multiple shape memory components 334 embedded within sole body 332.

Figure 18:
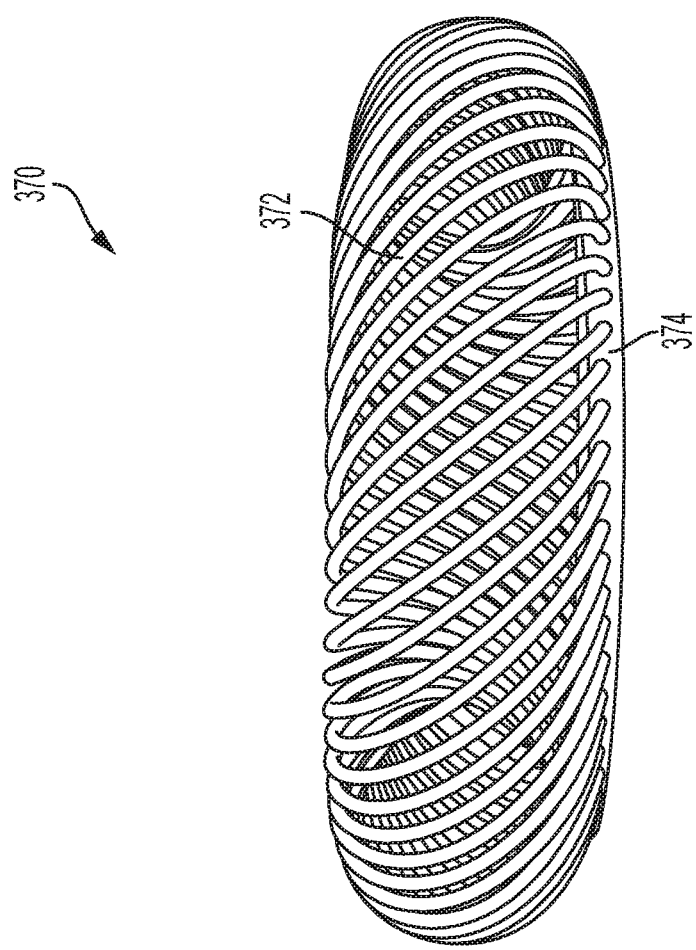
FIG. 18 shows a side view of a shape memory component for a shape memory sole according to some embodiments.
Figure 19:
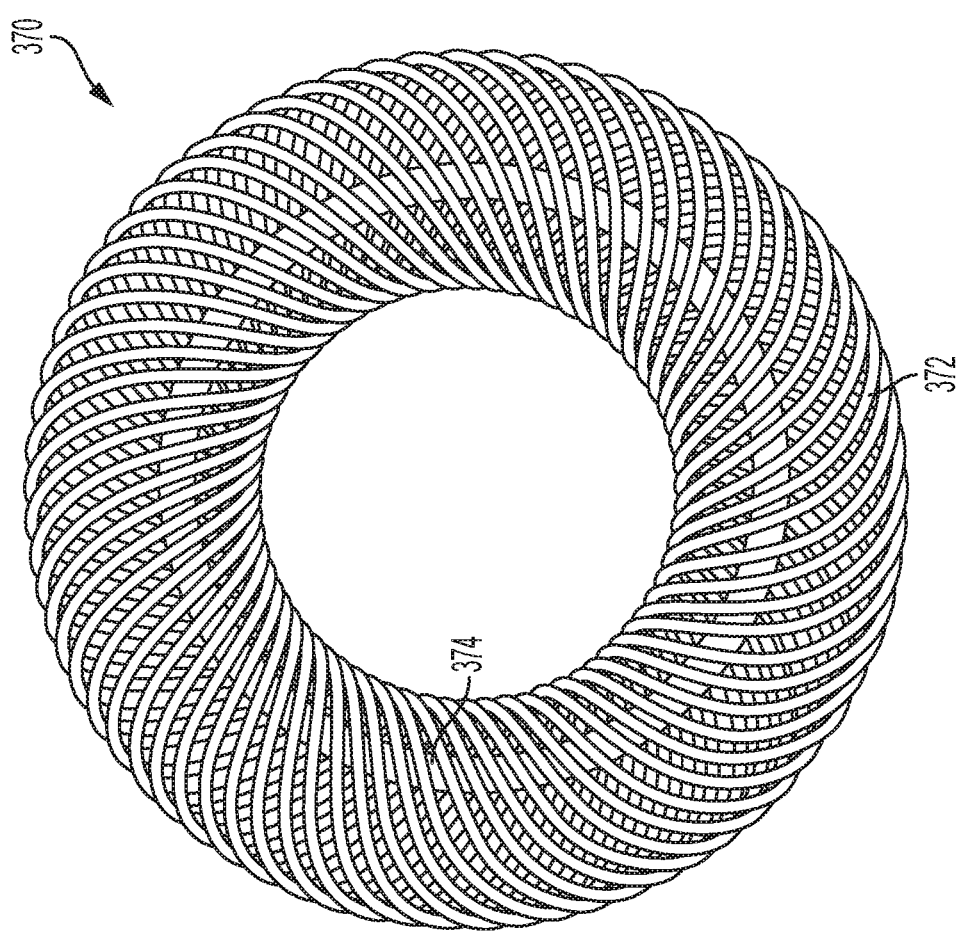
FIG. 19 shows a top view of a shape memory component for a shape memory sole according to some embodiments.

In some embodiments, shape memory component 334 is a molded component. In some embodiments, shape memory component 334 is a 3D printed component. Shape memory component 340 (FIGS. 12 and 13), 350 (FIGS. 14 and 15), 360 (FIGS. 16 and 17), or 370 (FIGS. 18 and 19) may be used as shape memory component 334 embedded within sole body 332. However, these shape memory components are only examples and other configurations may also be used. For example, shape memory component 334 may have a different shape (e.g., cubic, rectangular, spherical, cylindrical, disc-shaped, etc.) than the donut-shaped shape memory components 340, 350, 360, 370 shown in FIGS. 12-19. In some embodiments, shape memory component 340 (FIGS. 12 and 13), 350 (FIGS. 14 and 15), 360 (FIGS. 16 and 17), or 370 (FIGS. 18 and 19) may be used to form the entire midsole (rather than as a shape memory component embedded within a midsole). Thus, an entire midsole may be constructed of a similar pattern and/or shape as that shown by shape memory component 340 (FIGS. 12 and 13), 350 (FIGS. 14 and 15), 360 (FIGS. 16 and 17), or 370 (FIGS. 18 and 19). In some embodiments, other shapes may be used for an entire midsole (e.g., cubic, rectangular, spherical, cylindrical, disc-shaped, etc.).

Figure 12:
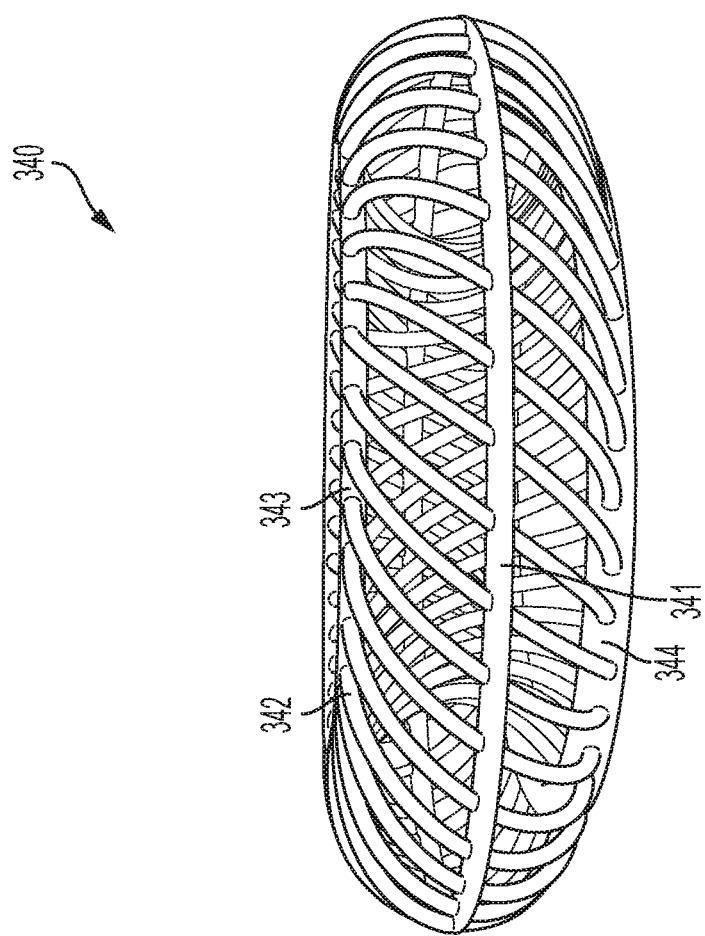
FIG. 12 shows a side view of a shape memory component for a shape memory sole according to some embodiments.
Figure 13:
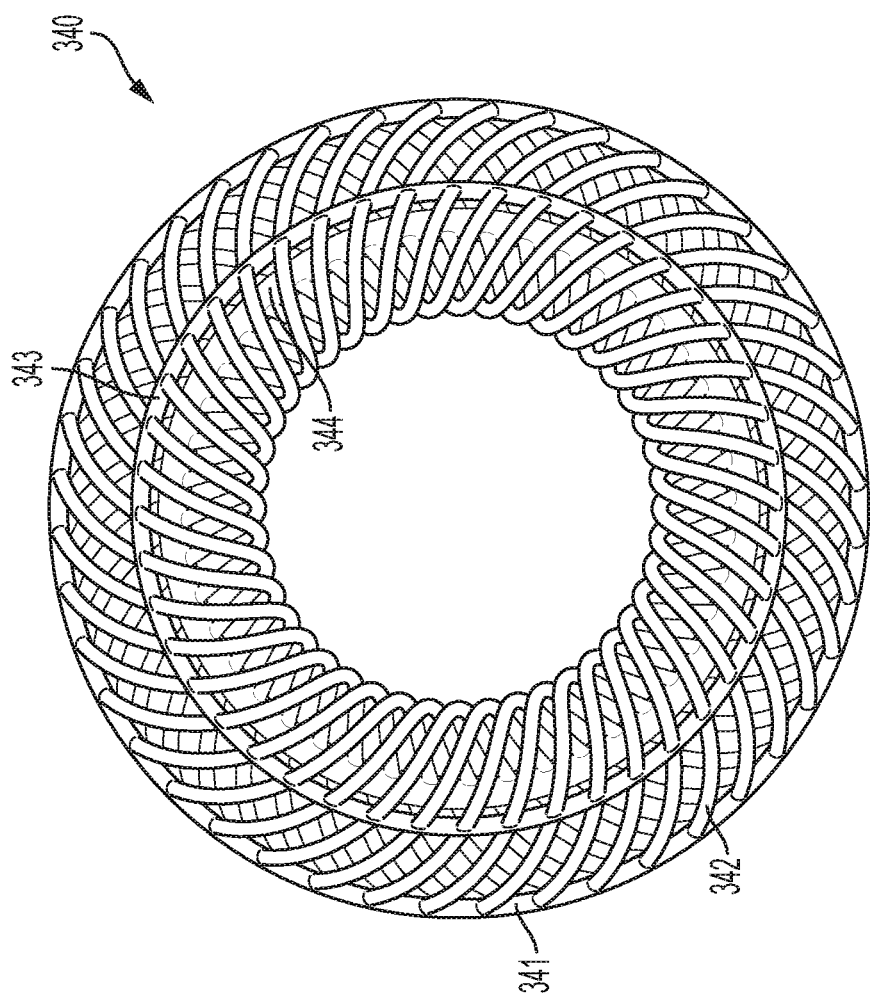
FIG. 13 shows a top view of a shape memory component for a shape memory sole according to some embodiments.

FIGS. 12 and 13 show a shape memory component 340 that may be embedded within a sole (e.g., sole 330) to form a shape memory sole. Shape memory component 340 may be a molded component. In some embodiments, shape memory component 340 may be made of a plurality of elongate shape memory components. For example, shape memory component 340 may include a top circular component 343, a bottom circular component 344, and an intermediate circular component 341 disposed between top circular component 343 and bottom circular component 344. In some embodiments, intermediate circular component 341 has a wider diameter than top circular component 343 and bottom circular component 344. In some embodiments, the diameter of top circular component 343 is equal to the diameter of bottom circular component 344. In some embodiments, the diameter of top circular component 343 is different than the diameter of bottom circular component 344. In some embodiments, shape memory component 340 includes a spiral shape memory component 342 that spirals through top circular component 343, intermediate circular component 341, and bottom circular component 344 to form a donut-shaped shape memory component 340, as shown in FIG. 13. In some embodiments, intermediate circular component 341 is the outermost portion of shape memory component 340.

Figure 14:
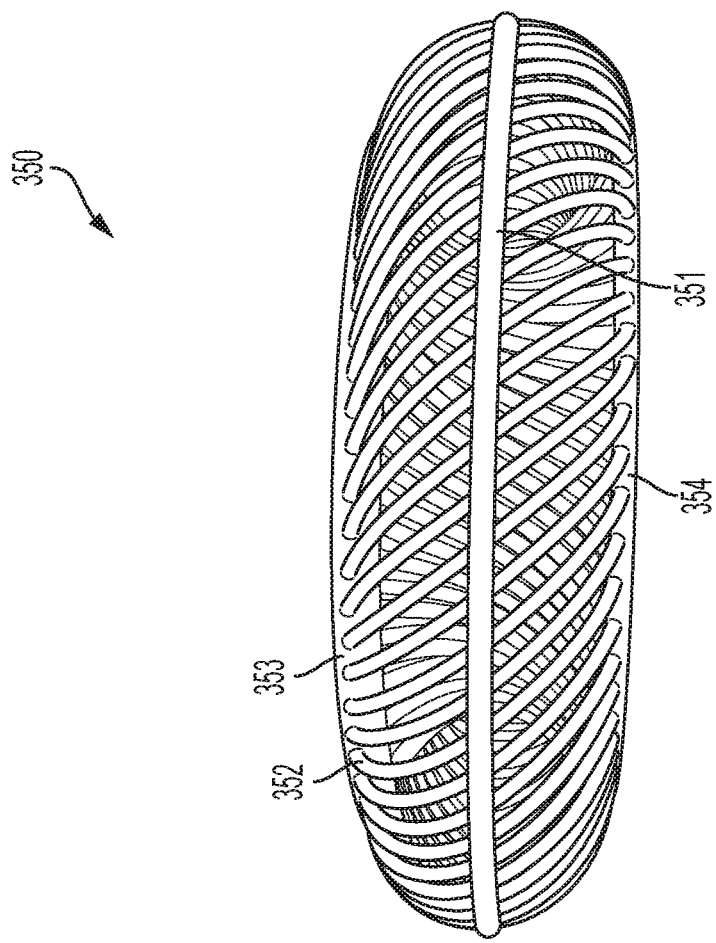
FIG. 14 shows a side view of a shape memory component for a shape memory sole according to some embodiments.
Figure 15:
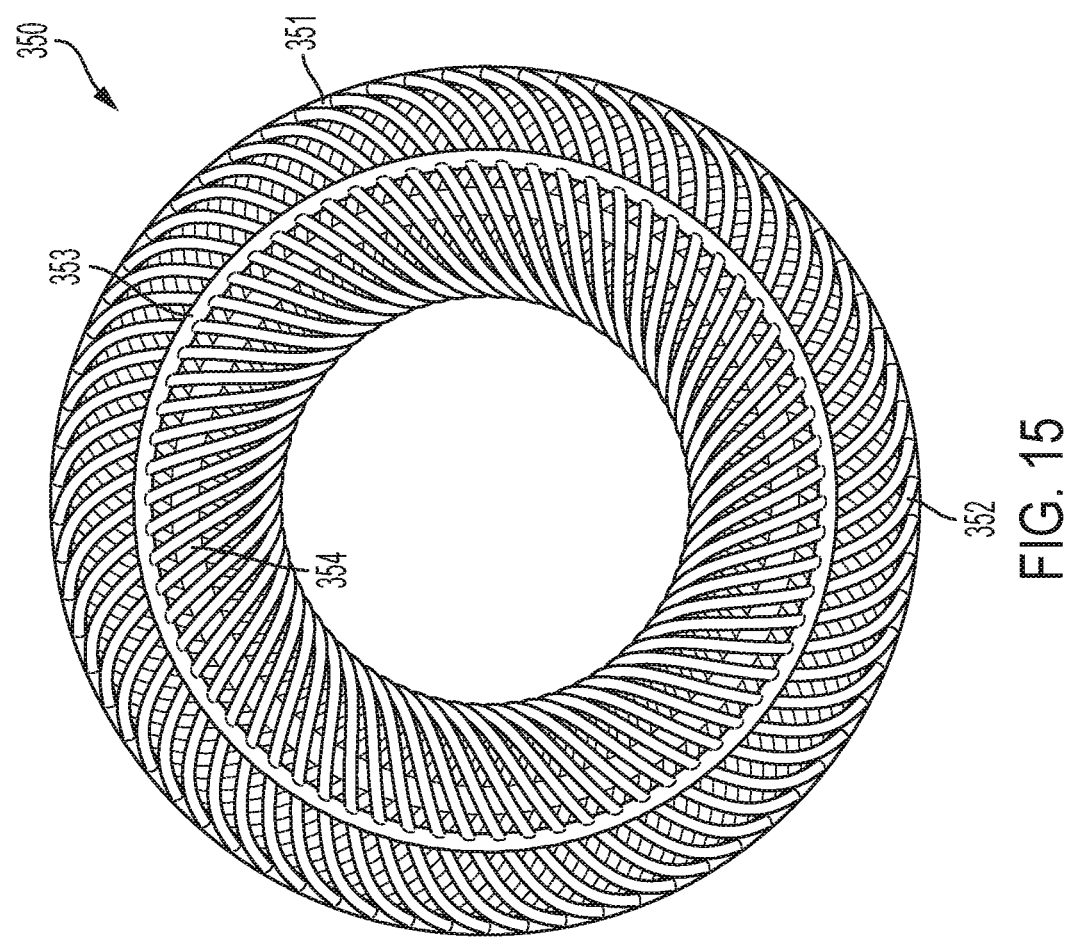
FIG. 15 shows a top view of a shape memory component for a shape memory sole according to some embodiments.

FIGS. 14 and 15 show a shape memory component 350 that may be embedded within a sole (e.g., sole 330) to form a shape memory sole. Shape memory component 350 may be similar to shape memory component 340, but with a tighter spiral configuration. Thus, shape memory component 350 may be a molded component and may be made of a plurality of elongate shape memory components, including a top circular component 353, a bottom circular component 354, an intermediate circular component 351 disposed between top circular component 353 and bottom circular component 354, and a spiral shape memory component 352 that spirals through top circular component 353, intermediate circular component 351, and bottom circular component 354 to form a donut-shaped shape memory component 350, as shown in FIG. 15. Spiral shape memory component 352 may have a tighter spiral (smaller gaps between the spirals) than spiral shape memory component 342. Other features described with respect to shape memory component 340 may also apply to shape memory component 350.

Figure 16:
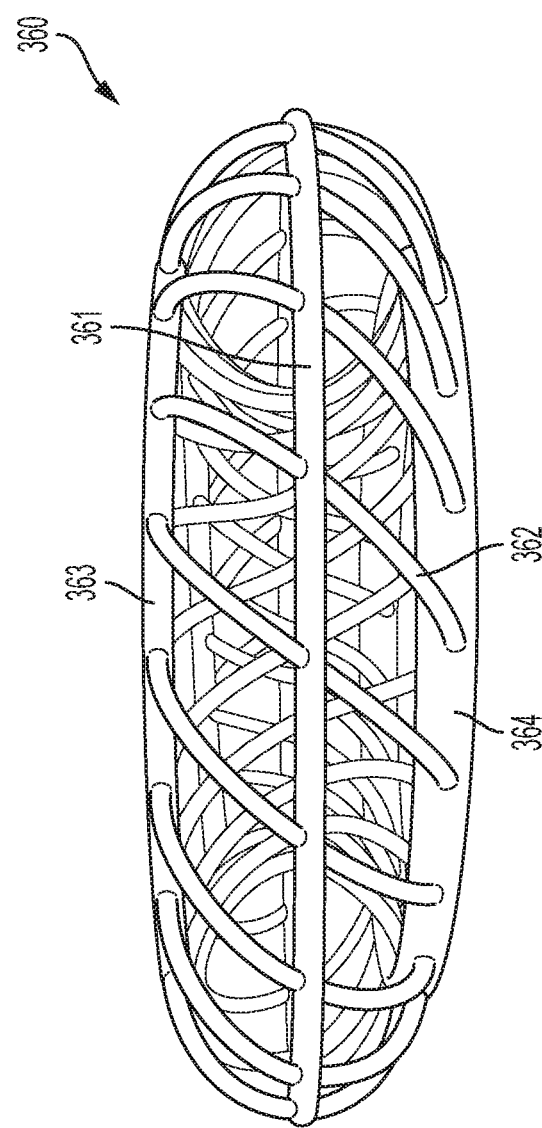
FIG. 16 shows a side view of a shape memory component for a shape memory sole according to some embodiments.
Figure 17:
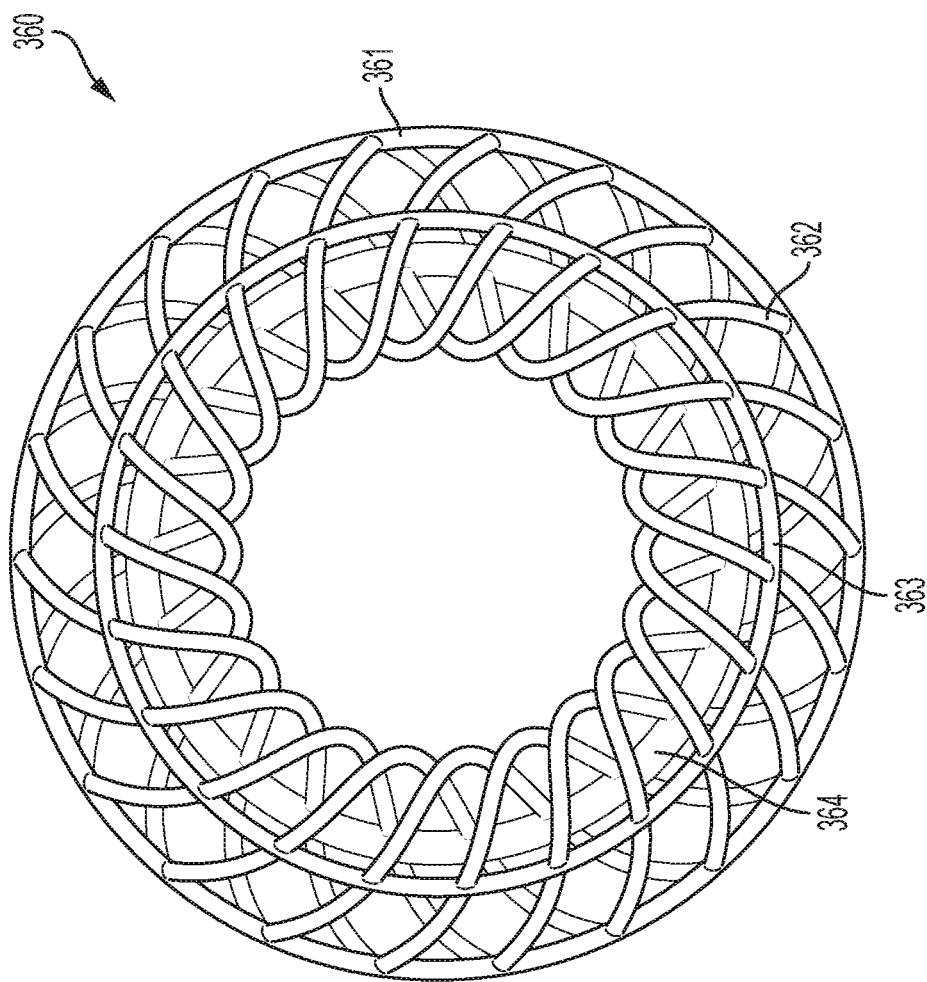
FIG. 17 shows a top view of a shape memory component for a shape memory sole according to some embodiments.

FIGS. 16 and 17 show a shape memory component 360 that may be embedded within a sole (e.g., sole 330) to form a shape memory sole. Shape memory component 360 may be similar to shape memory component 340, but with a looser spiral configuration. Thus, shape memory component 360 may be a molded component and may be made of a plurality of elongate shape memory components, including a top circular component 363, a bottom circular component 364, an intermediate circular component 361 disposed between top circular component 363 and bottom circular component 364, and a spiral shape memory component 362 that spirals through top circular component 363, intermediate circular component 361, and bottom circular component 364 to form a donut-shaped shape memory component 360, as shown in FIG. 17. Spiral shape memory component 362 may have a looser spiral (larger gaps between the spirals) than spiral shape memory component 342. Other features described with respect to shape memory component 340 may also apply to shape memory component 360.

FIGS. 18 and 19 show a shape memory component 370 that may be embedded within a sole (e.g., sole 330) to form a shape memory sole. Shape memory component 370 may be a molded component and may be made of a plurality of elongate shape memory components. In some embodiments, shape memory component 370 may include only one circular component 374, which may be a top circular component or a bottom circular component. Shape memory component 370 may include a spiral shape memory component 372 that spirals through circular component 374 to form a donut-shaped shape memory component 350, as shown in FIG. 19. Various spiral configurations may be used for spiral shape memory component 372 (e.g., a tight spiral similar to the spiral shown in FIG. 15, a loose spiral similar to the spiral shown in FIG. 17, or an intermediate spiral similar to the spiral shown in FIG. 13).

Figure 20:
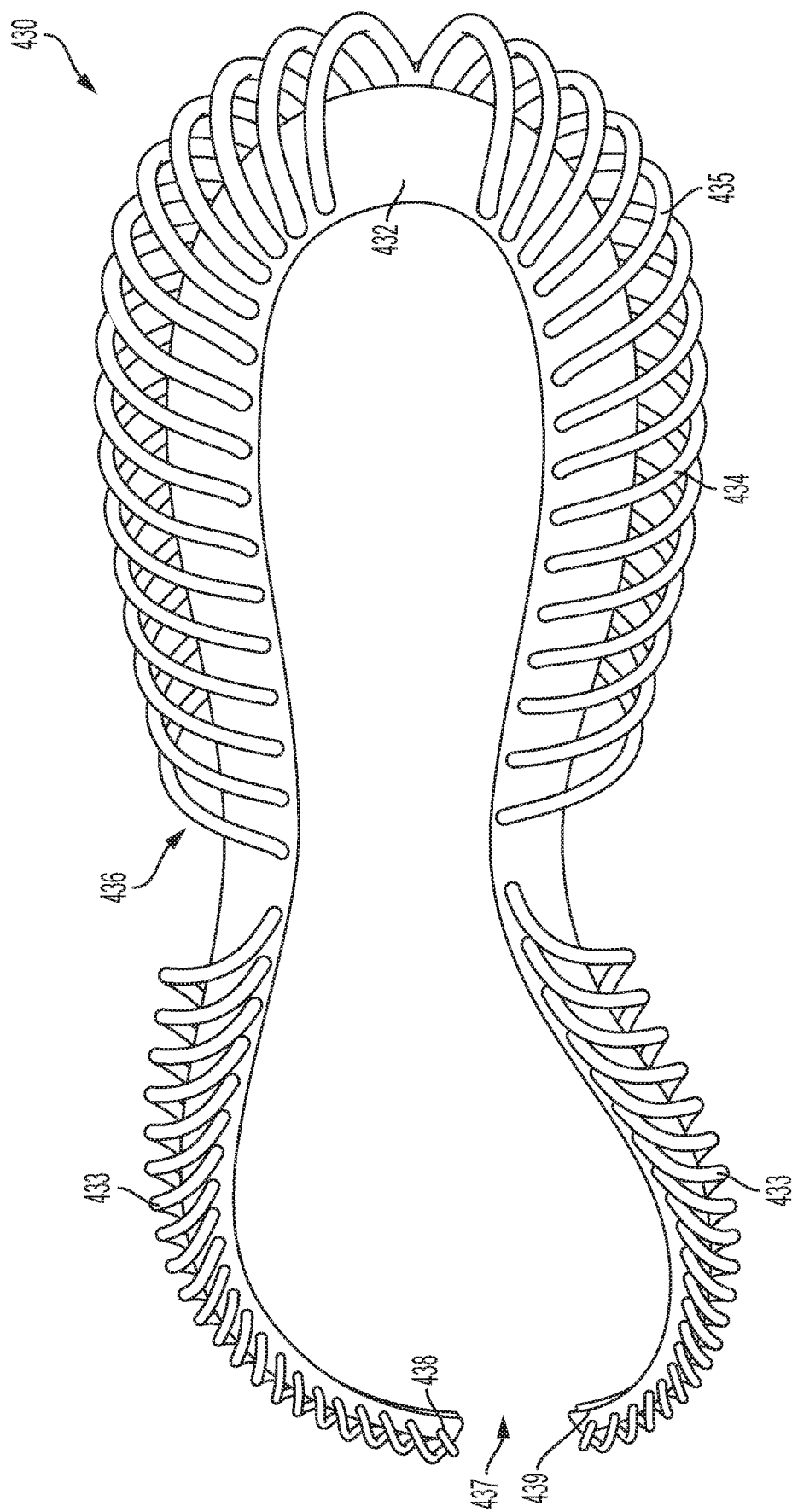
FIG. 20 shows a bottom view of a shape memory component for a shape memory sole according to some embodiments.
Figure 21:
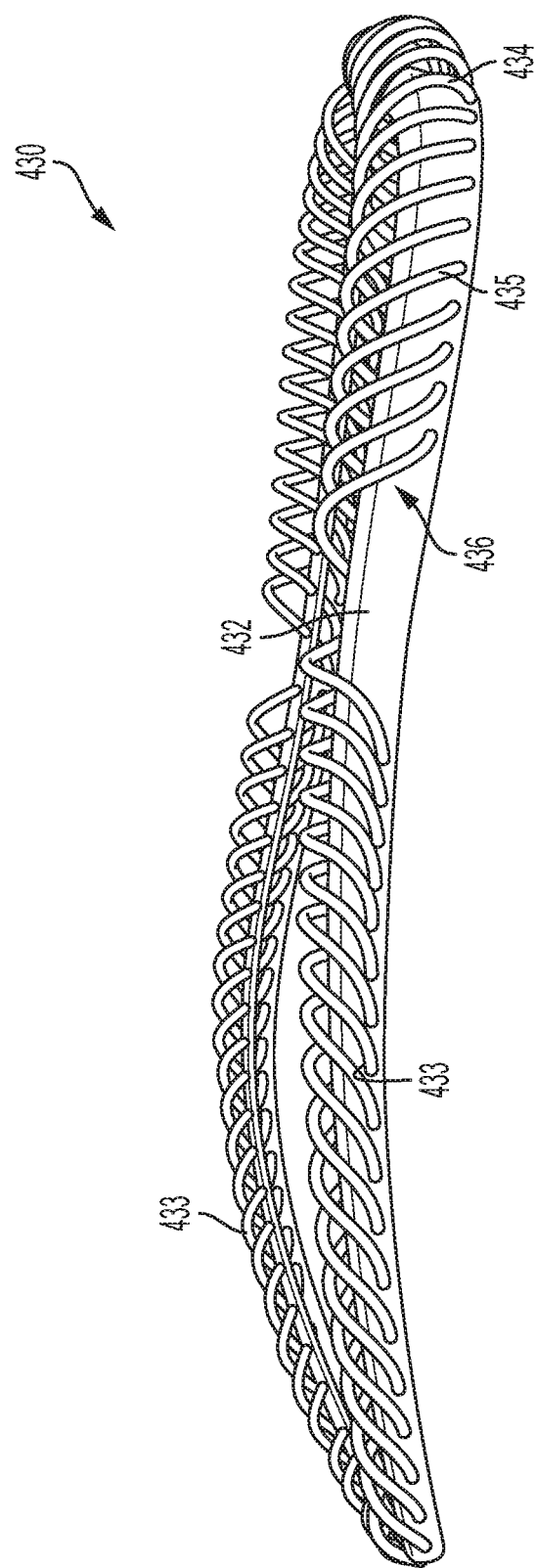
FIG. 21 shows a side view of a shape memory component for a shape memory sole according to some embodiments.

Another shape memory component 430 is shown in FIGS. 20 and 21. Shape memory component 430 may be a molded component or a component made by additive manufacturing (e.g., 3D printing). In some embodiments, shape memory component 430 may be embedded within a sole, such as sole 330. In some embodiments, shape memory component 430 may form an exterior portion of a sole. For example, shape memory component 430 may be partially embedded within a sole or attached to a sole.

In some embodiments, shape memory component 430 includes a base 432 and one or more spiral shape memory components 434. In some embodiments, base 432 extends around a perimeter of a sole. In some embodiments, base 432 extends completely around a perimeter of a sole. In some embodiments, base 432 extends only partially around a perimeter of a sole. For example, as shown in FIG. 20, there may be a gap 437 between two portions 438, 439 of base 432, which otherwise extends around a perimeter of a sole. One or more spiral shape memory components 434 spiral through base 432, as shown in FIGS. 20 and 21, thus forming a cavity or tunnel 436 between spiral shape memory components 434 and base 432. In some embodiments, shape memory component 430 includes a forefoot spiral configuration 433 and a heel spiral configuration 435. In some embodiments, tunnel 436 is larger in heel spiral configuration 435 than in forefoot spiral configuration 433.

In some embodiments, spiral shape memory components 434 extend below base 432. In some embodiments, spiral shape memory components 434 form a ground-contacting surface of the sole.

Various embodiments described herein provide shape memory soles for articles of footwear. The shape memory sole provides a lightweight sole that cushions and supports the wearer's feet. Moreover, the shape memory sole maintains these characteristics over time, withstanding wear and tear due to the properties of the shape memory sole, which may include a shape memory alloy or a plastic polymer with superelastic properties. Further variations of the embodiments described above may also be provided. For example, it is within the scope of this disclosure for any of the shape memory components discussed above (e.g., shape memory components 34, 134, 234, 334, 340, 350, 360, 370, 434) to be either a shape memory component made of a shape memory alloy or a shape memory component made of a different superelastic material (e.g., plastic polymer with superelastic properties). In addition, it is within the scope of this disclosure for any features (e.g., material, material properties, manufacturing processes, configurations, etc.) described with respect to one shape memory component (e.g., shape memory components 34, 134, 234, 334, 340, 350, 360, 370, 434) to also apply to other shape memory components described above (e.g., shape memory components 34, 134, 234, 334, 340, 350, 360, 370, 434).

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An article of footwear comprising:
   an upper; and
   a sole coupled to the upper, the sole comprising one or more elongate shape memory components forming a midsole, wherein the one or more elongate shape memory components bow downwardly from the upper to define a cavity between the upper and the one or more elongate shape memory components,
   wherein each of the one or more elongate shape memory components is coupled to the sole at a medial side of the sole and at a lateral side of the sole, and extends across the sole in a transverse direction, and
   wherein the upper forms a top boundary of the cavity.

2. The article of footwear of claim 1, wherein the one or more elongate shape memory components comprise a nickel titanium alloy.

3. The article of footwear of claim 1, wherein the midsole further comprises a frame that receives the one or more elongate shape memory components.

4. The article of footwear of claim 1, further comprising a covering enclosing the one or more elongate shape memory components.

5. The article of footwear of claim 1, further comprising a component disposed in the cavity between the upper and the one or more elongate shape memory components.

6. The article of footwear of claim 1, wherein the one or more elongate shape memory components extend back and forth in a transverse direction from a heel of the sole to a toe of the sole.

7. The article of footwear of claim 6, wherein the one or more elongate shape memory components comprises only one elongate shape memory component.

8. The article of footwear of claim 1, wherein the one or more elongate shape memory components are spaced longitudinally apart from each other.

9. The article of footwear of claim 1, wherein each of the one or more elongate shape memory components has opposing ends that are connected to a base of the sole, and wherein between its opposing ends each of the one or more elongate shape memory components is free from connection to the base or others of the elongate shape memory components.

10. The article of footwear of claim 1, wherein each of the one or more elongate shape memory components is coupled to the sole at a first position at the medial side of the sole and at a second position at the lateral side of the sole,
wherein the first position is disposed proximate to a medial edge of the sole, and
wherein the second position is disposed proximate to a lateral edge of the sole.

11. An article of footwear comprising:
one or more shape memory components shaped to form a bottom of a midsole; and
a base disposed above and receiving the one or more shape memory components,
wherein the one or more shape memory components bow downwardly from the base to define a cavity between the one or more shape memory components and the base,
wherein each of the one or more elongate shape memory components is received by the base at a medial side of the base and at a lateral side of the base, and extends across the base in a transverse direction, and
wherein the one or more shape memory components form a bottom boundary of the cavity.

12. The article of footwear of claim 11, wherein the base comprises a frame forming part of the midsole.

13. The article of footwear of claim 11, wherein the base comprises foam.

14. The article of footwear of claim 11, wherein the base comprises an upper.

15. The article of footwear of claim 11, wherein the one or more shape memory components comprises a nickel titanium alloy.

16. The article of footwear of claim 11, wherein the one or more shape memory components comprises wire.

17. The article of footwear of claim 11, wherein the one or more shape memory components comprises ribbon-shaped components.

18. A method of making an article of footwear, the method comprising:
arranging one or more shape memory components on a base to form a midsole; and
attaching an upper to the midsole;
wherein arranging the one or more shape memory components forms a cavity between the base and the one or more shape memory components,
wherein the one or more shape memory components form a bottom boundary of the cavity,
wherein the one or more shape memory components bow downwardly from the base, and
wherein each of the one or more elongate shape memory components is coupled to the base at a medial side of the base and at a lateral side of the base, and extends across the base in a transverse direction.

19. The method of claim 18, further comprising forming the one or more shape memory components by an additive process.

20. The method of claim 18, wherein the cavity extends from a heel of the article of footwear to a toe of the article of footwear.

21. The method of claim 18, wherein the base comprises a frame with holes.

22. The method of claim 21, wherein arranging the one or more shape memory components on the base comprises inserting the one or more shape memory components through the holes.

* * * * *